(12) United States Patent
Grewer et al.

(10) Patent No.: US 11,231,106 B2
(45) Date of Patent: Jan. 25, 2022

(54) METHOD FOR DETERMINING THE ENGAGED GEAR IN A MANUAL GEARBOX

(71) Applicant: FORD GLOBAL TECHNOLOGIES, LLC, Dearborn, MI (US)

(72) Inventors: Christoph Grewer, Cologne NRW (DE); Daniel Roettger, Liege (BE); Tobias Emig, Gelsenkirchen NRW (DE); Klemens Grieser, Langenfeld NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 16/245,665

(22) Filed: Jan. 11, 2019

(65) Prior Publication Data

US 2019/0219153 A1 Jul. 18, 2019

(30) Foreign Application Priority Data

Jan. 12, 2018 (DE) ...................... 10 2018 200 446.3

(51) Int. Cl.
*F16H 59/70* (2006.01)
*F16D 48/06* (2006.01)
(Continued)

(52) U.S. Cl.
CPC ........... *F16H 59/70* (2013.01); *F16D 48/068* (2013.01); *F16D 2500/1082* (2013.01); *F16D 2500/1083* (2013.01); *F16D 2500/3067* (2013.01); *F16D 2500/3068* (2013.01); *F16D 2500/30807* (2013.01); *F16D 2500/3108* (2013.01); *F16H 59/40* (2013.01); *F16H 59/44* (2013.01);
(Continued)

(58) Field of Classification Search
None
See application file for complete search history.

(56) References Cited

U.S. PATENT DOCUMENTS 4,646,891 A * 3/1987 Braun ............... B60W 30/1819
192/111.12
5,136,897 A * 8/1992 Boardman ............ B60W 10/06
477/84
(Continued)

FOREIGN PATENT DOCUMENTS

DE 10207940 A1 9/2003
EP 1950461 A2 * 7/2008 ............ F16H 59/68
WO 2014135831 A2 9/2014

*Primary Examiner* — Timothy Hannon
(74) *Attorney, Agent, or Firm* — Vincent Mastrogiacomo; Brooks Kushman P.C.

(57) ABSTRACT

A method for determining the engaged gear in a manual gearbox of a vehicle comprising a number of gears is described, wherein the vehicle comprises an engine, the manual gearbox, and at least one clutch. The method comprises the following steps: determination of the revolution rate of the engine as a function of time; differentiating the determined revolution rate of the engine against time; determination of the speed of the vehicle; and determination of the engaged gear based on characteristic curves of the revolution rate of the engine as a function of time for a number of the gears in the case of a fixed rate of engagement of the clutch, the revolution rate of the engine, the differential of the revolution rate of the engine against time and the speed of the vehicle.

14 Claims, 3 Drawing Sheets

(51) Int. Cl.
  *F16H 59/40*    (2006.01)
  *F16H 59/36*    (2006.01)
  *F16H 59/44*    (2006.01)

(52) U.S. Cl.
  CPC .. *F16H 2059/363* (2013.01); *F16H 2059/366* (2013.01); *F16H 2059/706* (2013.01)

(56) References Cited

U.S. PATENT DOCUMENTS

| | | |
|---|---|---|
| 6,319,173 B1 | 11/2001 | Patel et al. |
| 6,937,932 B2 | 8/2005 | Sauter |
| 6,939,268 B2 | 9/2005 | Devore et al. |
| 9,080,619 B2 | 7/2015 | Li et al. |
| 10,036,435 B2 | 7/2018 | Milehins et al. |
| 2003/0220171 A1 | 11/2003 | Sauter |
| 2004/0083045 A1* | 4/2004 | Nohara .................. F16H 59/70 701/51 |
| 2004/0166992 A1* | 8/2004 | Buchanan ........... F16H 61/0437 477/181 |
| 2012/0265427 A1 | 10/2012 | Petridis et al. |
| 2014/0309899 A1 | 10/2014 | Li et al. |
| 2015/0012194 A1* | 1/2015 | Braun ..................... F16H 59/04 701/64 |
| 2015/0285372 A1* | 10/2015 | Shirai .................... F16H 61/18 701/51 |
| 2016/0304082 A1 | 10/2016 | Liu et al. |

* cited by examiner

METHOD FOR DETERMINING THE ENGAGED GEAR IN A MANUAL GEARBOX

CROSS-REFERENCE TO RELATED APPLICATIONS

This application claims foreign priority benefits under 35 U.S.C. § 119(a)-(d) to DE Application 10 2018 200 446.3 filed Jan. 12, 2018, which is hereby incorporated by reference in its entirety.

TECHNICAL FIELD

The present invention concerns a method for determining the engaged gear in a manual gearbox of a vehicle comprising a number of gears. The invention also provides a method for operating a vehicle and a vehicle, in particular a motor vehicle.

BACKGROUND

At present with the vast number of vehicles with a manual gearbox, the currently engaged gear with the drive train closed is calculated based on the ratio of the revolution rate of the engine and the speed of the vehicle. Examples of this are disclosed in the document U.S. Pat. No. 6,937,932 B2 and in the document WO 2014/135831 A2. A process such as this is sufficient for the basic usability of a vehicle and for comfort applications that propose the engagement of certain gears for different driving situations, inter alia in order to improve performance and/or fuel efficiency.

In connection with the introduction of electronically controlled clutches and further complex applications for vehicles with manual gearboxes, information about the currently engaged gear or the gear that is to be engaged is increasingly of importance. Some of said applications profit from very early or up-to-date gear information. One of said applications comprises a strategy resulting from a no-load situation or a situation in which the vehicle is rolling.

In order to automatically synchronize the engine with the input shaft of the gearbox, the knowledge of the gear ratio is mandatory. Without said synchronisation of the two clutch plates, slowing of the vehicle that can be perceived by the driver and that is not wanted occurs.

Special sensors are usually applied to detect the exact position of the gear lever. This is disclosed for example in the document US 2012/0625427 A1. However, said sensor causes additional costs, additional weight and requires storage space.

Against this background, it is the object of the present invention to provide an advantageous method for determining the engaged gear and a method for operating a vehicle, wherein in particular an additional sensor for gear detection can be omitted.

SUMMARY

This object is achieved by a method for determining the engaged gear in a manual gearbox of a vehicle, a method for operating a vehicle, and by a vehicle.

The method according to the invention for determining the engaged gear in a manual gearbox of a vehicle comprising a number of gears relates to a vehicle comprising an engine, said manual gearbox and at least one clutch. The method comprises the following steps: The revolution rate of the engine is determined as a function of time, for example it is measured. The determined, for example measured, revolution rate of the engine is differentiated against time. I.e. in other words, the gradient is determined, for example calculated. The speed of the vehicle is determined, for example measured. The engaged gear is determined based on characteristic curves of the revolution rate of the engine as a function of time for a number of the gears in the case of a fixed rate of engagement of the clutch, on the revolution rate of the engine, on the derivative of the revolution rate of the engine against time and on the speed of the vehicle. The engaged gear in particular can be calculated during this.

A characteristic curve means the relationship between two mutually dependent physical variables that is characteristic of a component, an assembly or a device, in the present case of an engaged gear of a gearbox. The characteristic curves of the revolution rate of the engine are preferably determined as a function of time for a number of the gears in the case of a fixed rate of engagement of the clutch as part of the method or in advance for the vehicle used. In other words, the characteristic engine revolution rate profile is preferably defined as a function of time for each gear for a specified rate of engagement of the clutch or of the clutch plates coming together. In principle, it is sufficient to have said characteristic curves available or to determine said characteristic curves for a number of the gears.

Advantageously, said characteristic curves are available or defined for all forward gears. Preferably, for each available gear, i.e. for all gears, said characteristic curves are defined or are available for carrying out the method according to the invention. In the latter case, the characteristic curves can have been determined in advance and can be called up from a database for carrying out the method according to the invention.

Engaging the clutch of a moving vehicle with a gear engaged initially causes slip between the two clutch plates. The engine is dragged along by the mass of the vehicle. If both revolution rates are identical and the force on the clutch plates is large enough, the drive train is closed. The degree or the extent to which the engine accelerates correlates with the clutch slip. This means that the rotation speed or the revolution rate of the clutch plate surface on the vehicle side depends on the engaged gear and the speed of the vehicle. The energy of the clutch plate can be calculated using the mass of the vehicle and the time required for the engagement of the clutch. The more energy in a defined time that is transferred to or by the engine, the higher is the angular acceleration. By keeping the rate of engagement of the clutch constant when engaging each gear, a characteristic revolution rate of the engine-characteristic curve exists for each gear.

The gear G can thus be represented as a function f of the clutch position K against time t, the speed of the vehicle v against time t, the mass of the vehicle MF, the mass of the engine MM and friction R (G=f (K(t), v(t), MF, MM, R). By defining and measuring all vehicle characteristics in this way while taking into account the current driving situation, information about the engaged gear can be obtained before the clutch is fully engaged. This has the advantage that the engagement of an unsuitable gear with the risk of damage to vehicle components is avoided.

The method according to the invention has the advantage that the engaged gear can be determined without an additional sensor for detection of the position of the gearshift. This reduces the costs, the weight and the necessary storage space associated with an additional sensor.

In an advantageous version, the method according to the invention is carried out with an at least partly open drive train. The clutch can thus be at least partly disengaged while the method is being carried out. In particular, the clutch can be fully open. This has the advantage that determining the engaged gear can also be carried out if the known calculation methods, which presuppose a closed drive train or an engaged clutch and which are based on a calculation of the ratio of the revolution rate of the engine and the speed of the vehicle or the revolution rate of the wheels, cannot be applied reliably.

In a further version, the characteristic curves are calibrated while taking into account or while using the mass of the vehicle and/or the inertia of the engine and/or the position of the clutch as a function of time. This has the advantage that vehicle-specific or application-specific characteristic curves can be determined in this way. As a result, the determination of the engaged gear is made more accurate and the reliability of the determination is improved.

The determination of the revolution rate of the engine as a function of time is preferably carried out within a specified time window. The determination is carried out advantageously within a time window of no more than 300 milliseconds (300 ms). Shorter time windows are advantageous for this. In addition or alternatively, the determination of the speed of the vehicle can be carried out within a specified time window, for example within a time window of no more than 300 milliseconds (300 ms). Here too, shorter time windows are advantageous.

The method according to the invention for operating a vehicle concerns a vehicle comprising an engine, a manual gearbox with a number of gears and at least one clutch. The method comprises the following steps: The clutch is opened or disengaged. Opening or disengaging the clutch means that the flow of force between two clutch plates of the clutch is interrupted. Closing or engagement of the clutch means that the flow of force between two clutch plates of the clutch is established. After opening the clutch, the reduction of the speed of the vehicle is determined as a function of time, for example it is measured. This can be carried out within a specified time window. The currently engaged gear is determined according to a method for determining the engaged gear that is described above. The clutch is closed or engaged to a specified position. The revolution rate of the engine is determined, for example measured, as a function of time. This is preferably carried out within a specified time window. The derivative of the revolution rate of the engine against time is determined, for example calculated. This too can preferably be carried out within a specified time window. The gear to be engaged is based on the derivative of the revolution rate of the engine against time determined in the previous step and the characteristic curves for a number of the gears. The gear to be engaged is output, for example to a user interface. For this purpose, a signal with the determined gear to be engaged can be output.

The method has the advantage that it enables the output of a gear recommendation with simple means. In addition, it is inexpensive compared to other methods and is suitable for many applications.

In one advantageous version, the clutch used is an electronically controlled clutch. The manual gearbox can for example be designed as an automated manual gearbox. For example, a single clutch transmission or a dual clutch transmission can be used. In particular in connection with an electronically controlled clutch and/or an automated manual gearbox, the method according to the invention enables gear selection matching the respective driving situation and optimized in relation to fuel efficiency.

The vehicle can in principle be a motor vehicle or a ship. For example, the motor vehicle can be a passenger motor vehicle, a truck, a motor cycle or a moped.

The position of the clutch up to which the clutch is engaged that is specified within the context of the method according to the invention for operating a vehicle can preferably be determined adaptively, for example can be an adaptively learned position. This has the advantage that the specified position can be adapted application-specifically.

In an advantageous version, the determination of the revolution rate of the engine as a function of time and/or the determination of the derivative of the revolution rate of the engine against time and/or the determination of the gear that is to be engaged are carried out within a calibratable time window. The time window can for example be no more than 300 milliseconds (300 ms). Shorter time windows are advantageous for this. Calibration of the time window has the advantage that the method can be adapted to the respective requirement and to the driving situation. In particular, as a result the process time can be optimized.

The vehicle according to the invention comprises an engine, a manual gearbox with a number of gears, at least one clutch and a controller. The controller is designed to carry out a previously described method according to the invention for determination of the engaged gear and/or a previously described method according to the invention for operating a vehicle. In principle, the vehicle can be a motor vehicle, for example a passenger motor vehicle, a truck, a motor cycle or a moped, or a ship. In principle, the vehicle according to the invention has the same advantages as the previously described method according to the invention.

Overall, the present invention has the advantage that in particular in connection with electronically controlled clutches the selection of the gear that is to be engaged is optimized and a gear matching the respective situation is selected. As a result, stalling the engine in the case of a gear that is too high or too low is avoided.

Further features, properties and advantages of the present invention are described in detail below using exemplary embodiments with reference to the accompanying figures. All features described above and below are advantageous for this both individually and in any combination with each other. The exemplary embodiments described below are only examples that do not limit the subject matter of the invention, however.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
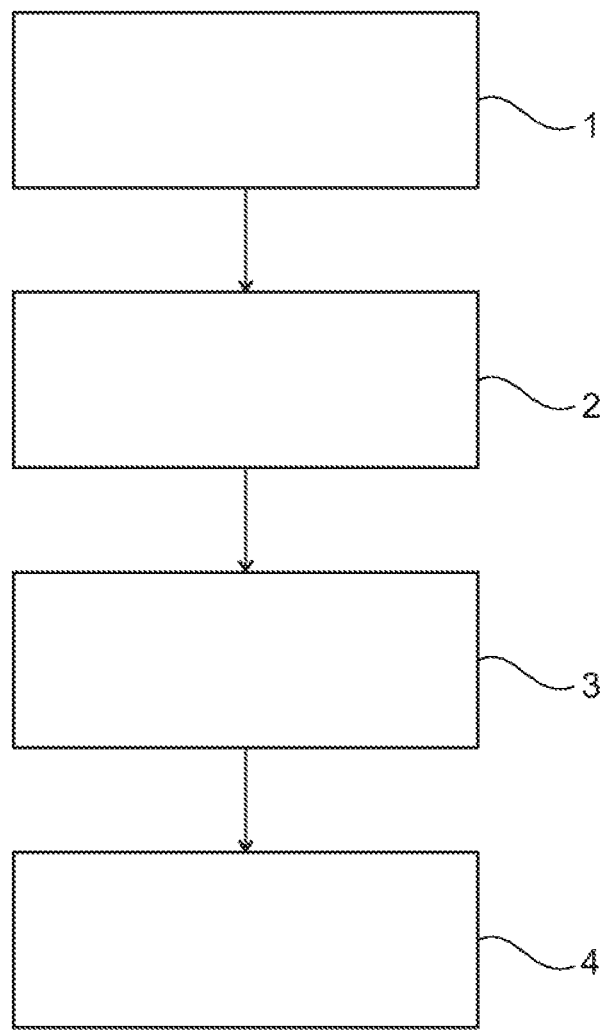
FIG. 1 shows schematically a method according to the invention for determining the engaged gear in the form of a flow chart.

A method according to the invention for determining the engaged gear in a manual gearbox using the flow chart shown in FIG. 1 is described in detail below. In step 1, the revolution rate of the engine is determined, for example measured, as a function of time. In step 2, the revolution rate determined in step 1 is differentiated against time. In step 3, the speed of the vehicle is determined, for example measured. In step 4, the engaged gear is determined, for example calculated, based on gear-specific characteristic curves of the revolution rate of the engine, the revolution rate of the engine, the differential of the revolution rate of the engine against time and the speed of the vehicle.

Said steps can be carried out respectively or as a whole within a specified time window, for example within 300 milliseconds or less. While the method for determination of the engaged gear is being carried out, the drive train can be at least partly open. The clutch can also be at least partly disengaged.

The characteristic curves of the revolution rate of the engine as a function of time for a number of the gears are determined for the case of a fixed rate of engagement of the clutch, i.e. for a specified rate of engagement of the clutch or of bringing the clutch plates together. The characteristic curves can be determined during the process. The characteristic curves can also be determined for the respective vehicle once, preferably before the application of the method, and can be available as data records for use during the method according to the invention. The characteristic curves can be calibrated while taking into account/using the mass of the vehicle and/or the inertia of the engine and/or the position of the clutch as a function of time.

Figure 2:
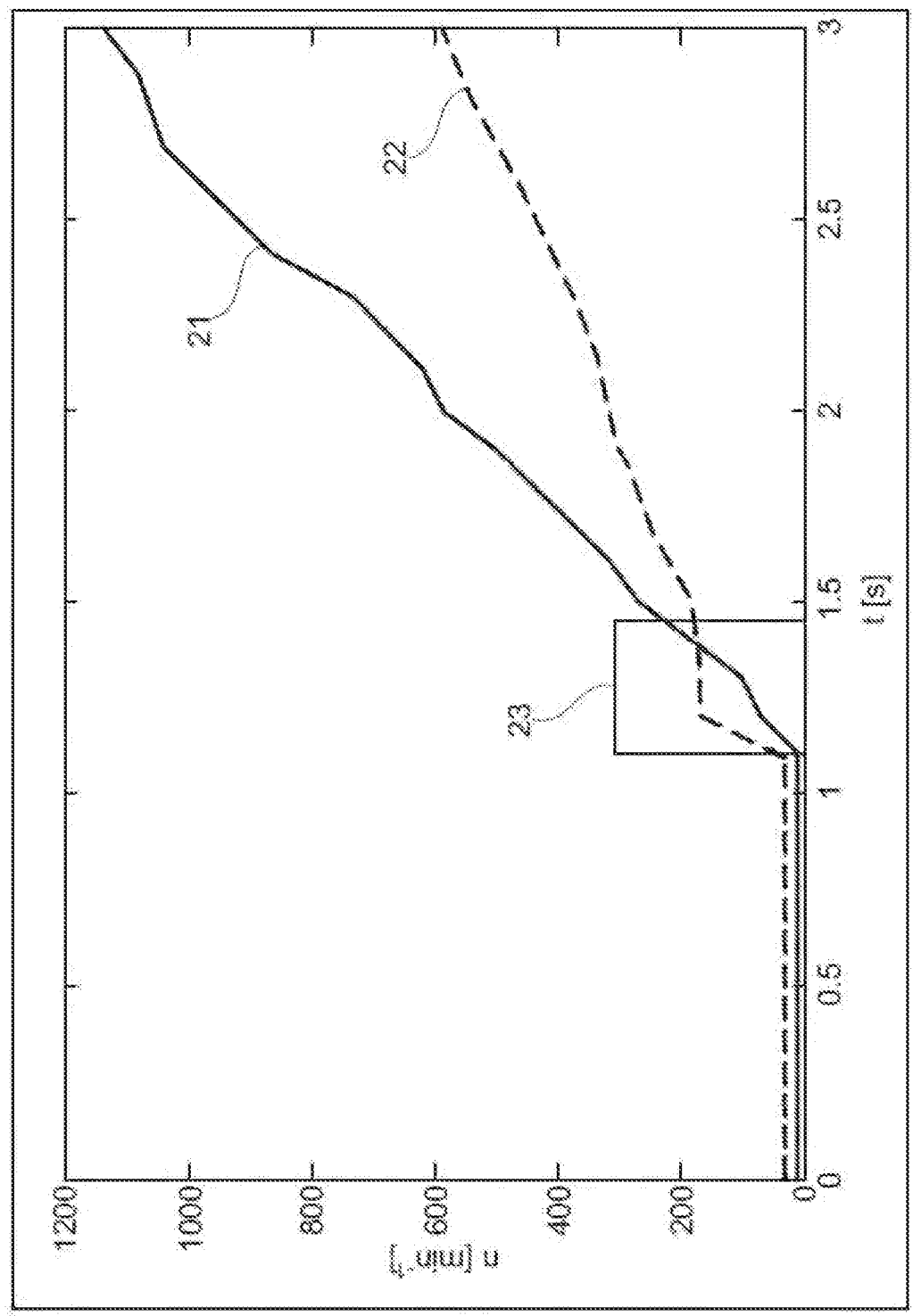
FIG. 2 shows schematically the dependency of the revolution rate of the engine on time for two gears.

FIG. 2 shows schematically the dependency of the revolution rate of the engine, n, in revolutions per minute (l/min) on the time, t, in seconds (s) for two gears. In the example shown, the curves 21 represent the engagement of the 3rd gear and the curves 22 represent the engagement of the 5th gear. The detection window is characterized by the reference number 23.

Figure 3:
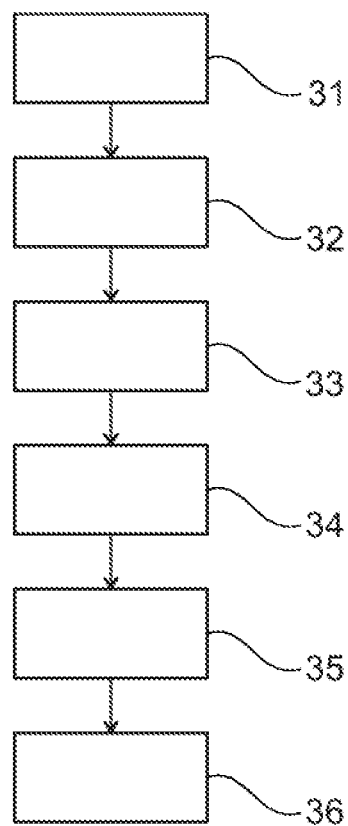
FIG. 3 shows schematically a method according to the invention for operating a vehicle in the form of a flow chart.

A method according to the invention for operating a vehicle using the flow chart shown in FIG. 3 is described in detail below. The initial situation at step 31 is of a rolling vehicle with a disengaged clutch. In step 32, the decrease in the speed of the vehicle is determined, in particular measured, as a function of time. This can be carried out within a specified time window. In step 33, the engaged gear can be determined by means of a method described in connection with FIG. 1. In step 34, the clutch is engaged or closed up to a specified position. This can be an adaptively learned position.

In step 35, the revolution rate of the engine is determined as a function of time and the differential of the revolution rate against time is determined, for example is calculated, and is analysed. This can be carried out within a specified time window. During the analysis, the gear to be engaged is determined based on the differential of the revolution rate of the engine against time and the characteristic curves. In step 36, a recommendation for the gear that is to be engaged is output, for example to a user interface.

Figure 4:
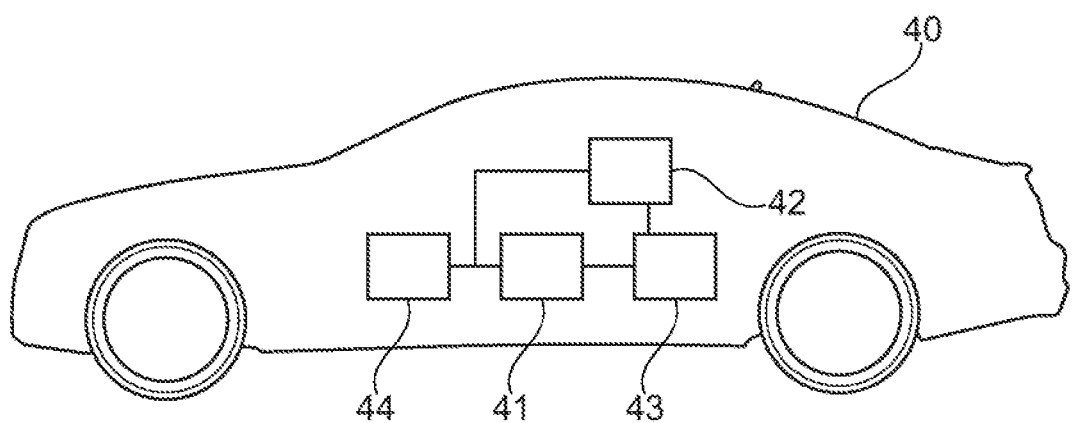
FIG. 4 shows schematically a motor vehicle according to the invention.

In FIG. 4, a motor vehicle 40 according to the invention is shown schematically. The motor vehicle 40 can be a passenger motor vehicle, a truck, a motor cycle or a moped. The motor vehicle 40 comprises an engine 44 and a manual gearbox 41, for example an automated manual gearbox. The manual gearbox 41 can be designed as a single clutch transmission or a dual clutch transmission. The motor vehicle also comprises a clutch 42, for example an electronically controlled clutch. The clutch 42 is functionally connected to the manual gearbox 41 and the engine 44 in the usual manner. Moreover, the motor vehicle 40 comprises a controller 43 that is designed for carrying out the method that is described above. The controller 43 is designed for transmitting suitable signals to the clutch 42 and/or the manual gearbox 41 for this.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a vehicle comprising an engine, a gearbox with a number of gears, and at least one clutch, the method comprising:
   deriving characteristic curves of a revolution rate of the engine as a function of time for each of the number of the gears, the characteristic curves based on a revolution rate of the engine, a differential of the revolution rate of the engine, and a speed of the vehicle;
   disengaging the at least one clutch;
   determining a rate of decrease in the speed of the vehicle as a function of time;
   determining the revolution rate of an engine of the vehicle as a function of time;
   differentiating the determined revolution rate of the engine against time;
   determining the speed of the vehicle;
   determining an engaged gear based on mapping the revolution rate of the engine, the differential of the revolution rate of the engine, and the speed of the vehicle to a first of the characteristic curves;
   engaging a clutch of the at least one clutch up to a specified position; and
   outputting a determined gear to be engaged.

2. The method of claim 1 wherein the at least one clutch comprises an electronically controlled clutch.

3. The method of claim 1 wherein the gearbox is an automated manual gearbox.

4. The method of claim 1 wherein the at least one clutch comprises two clutches and the gearbox and two clutches form a dual clutch transmission.

5. The method of claim 1 further comprising adaptively modifying the specified position.

6. The method of claim 1 wherein the determination of the revolution rate of the engine as a function of time is carried out within a calibratable time window.

7. The method of claim 1 further comprising:
   determining the gear to be engaged based on mapping the revolution rate of the engine, the differential of the revolution rate of the engine, and the speed of the vehicle to a second of the characteristic curves.

8. A method for determining an engaged gear in a vehicle, the method comprising:
   deriving characteristic curves of a speed of the engine as a function of time for each of a number of the gears of gearbox, the characteristic curves based on a speed of the engine of the engine, a differential of the speed of the engine, and a vehicle speed, wherein the characteristic curves of the speed of the engine are determined as a function of time based on a fixed rate of engagement of a clutch of the vehicle, and wherein the clutch is at least partly disengaged while the method is being carried out;

determining the engine speed of the vehicle as a function of time;

differentiating the determined engine speed against time;

determining the vehicle speed;

comparing the determined engine speed and differentiated engine speed to the characteristic curves to determine an engaged gear; and outputting the determined engaged gear.

9. The method of claim 8 wherein the characteristic curves are calibrated using a mass of the vehicle and/or an inertia of an engine of the vehicle.

10. The method of claim 8 wherein the determination of the engine speed as a function of time and/or the determination of the speed of the vehicle is/are carried out within a specified time window.

11. The method of claim 10 wherein the time window is equal to or shorter than 300 milli-seconds.

12. The method of claim 8, further comprising:
outputting a determined gear to be engaged.

13. The method of claim 12 further comprising:
engaging the clutch up to a specified position.

14. The method of claim 12 further comprising:
comparing the determined engine speed and differentiated engine speed to the characteristic curves to determine the gear to be engaged.

* * * * *